US006242121B1

(12) United States Patent
Pedicini et al.

(10) Patent No.: US 6,242,121 B1
(45) Date of Patent: Jun. 5, 2001

(54) PRIMARY METAL-POWER SOURCE AND VENTILATION SYSTEM FOR THE SAME

(75) Inventors: Christopher S Pedicini, Roswell; John D. Witzigreuter, Dallas; Gary E. Gray, Smyrna, all of GA (US)

(73) Assignee: AER Energy Resources, Inc., Smyrna, GA (US)

( * ) Notice: Subject to any disclaimer, the term of this patent is extended or adjusted under 35 U.S.C. 154(b) by 0 days.

(21) Appl. No.: 09/177,852

(22) Filed: Oct. 23, 1998

Related U.S. Application Data

(60) Provisional application No. 60/063,155, filed on Oct. 24, 1997.

(51) Int. Cl.[7] .................................................. H01M 04/00
(52) U.S. Cl. ................................ 429/27; 429/34; 429/82; 429/83; 429/71
(58) Field of Search .............................. 429/101, 71, 26, 429/27, 34, 38, 13, 82, 83

(56) References Cited

U.S. PATENT DOCUMENTS

| 4,913,983 | | 4/1990 | Cheiky . | |
|---|---|---|---|---|
| 5,258,239 | * | 11/1993 | Kobayashi | 429/27 |
| 5,356,729 | | 10/1994 | Pedicini . | |
| 5,387,477 | * | 2/1995 | Cheiky | 429/26 |
| 5,571,630 | * | 11/1996 | Cheiky | 429/26 |
| 5,645,952 | * | 7/1997 | Lampinen et al. | 429/25 |
| 5,691,074 | | 11/1997 | Pedicini . | |

* cited by examiner

Primary Examiner—Carol Chaney
Assistant Examiner—Raymond Alejandro
(74) Attorney, Agent, or Firm—Alston & Bird LLP

(57) ABSTRACT

A primary metal-air power source containing one or more metal-air cells incorporating an air manager in a power source housing of the power source. The power source provides intermittent use at high power levels over a long lifetime while demonstrating a high utilization of the metal, such as zinc, making up the metal-air cell's metal anode. The power source provides 80% of its amp hour capacity for at least 30 days after the initial partial discharge at a power level of at least 50 milliwatts. The cumulative run time may comprise any number of intermittent connections to a load having varying duration. The ventilation system of the power source draws ambient airflow through an isolating passageway by operating an air mover which distributes the airflow to the metal-air cells. A portion of the airflow is recirculated by the air mover and returned to the metal-air cells and the remaining portion of the airflow is moved through a second isolating passageway to the exterior of the power source's power source housing. The movement of airflow into and out of the power source is minimized during in-service storage.

9 Claims, 4 Drawing Sheets

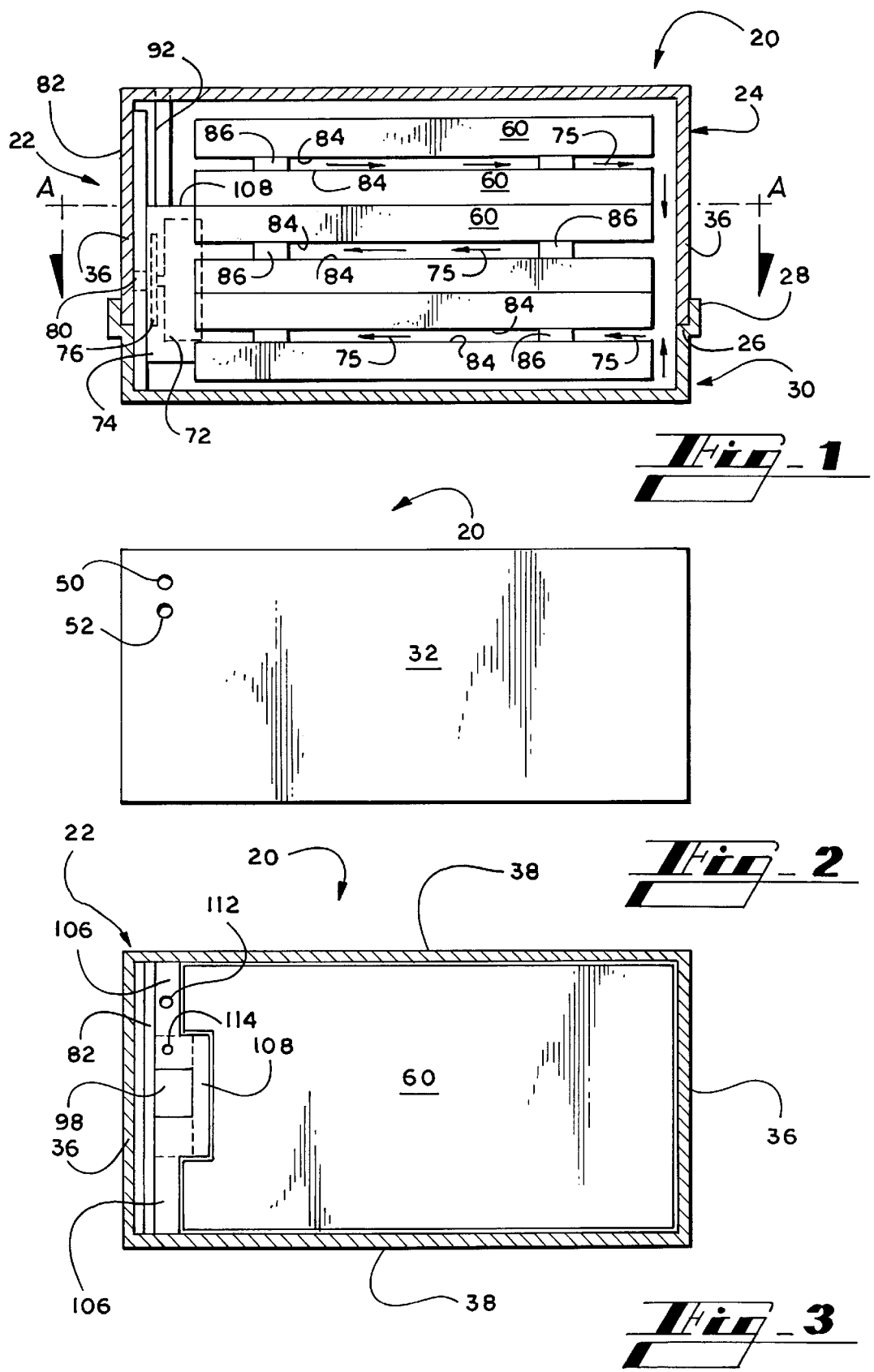

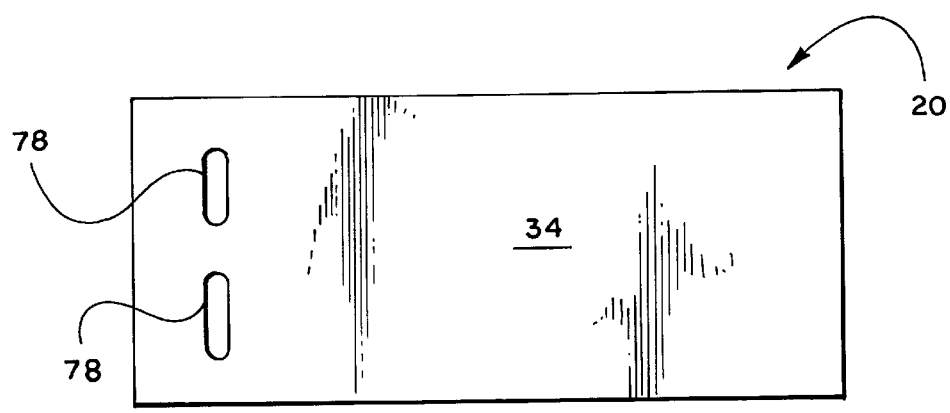
Fig_4
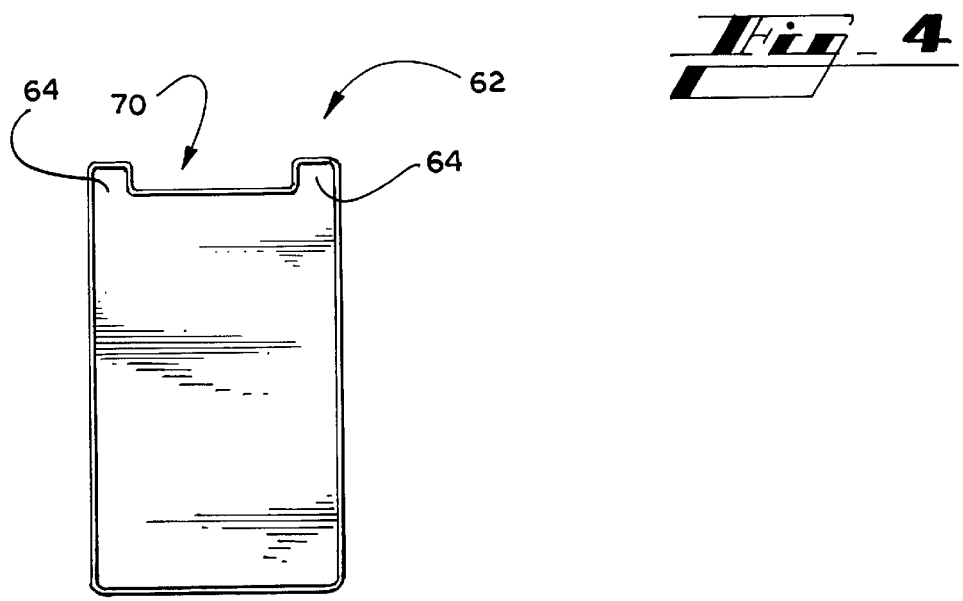
Fig_5
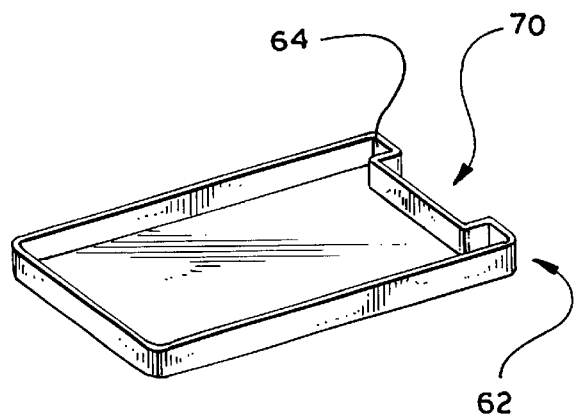
Fig_6

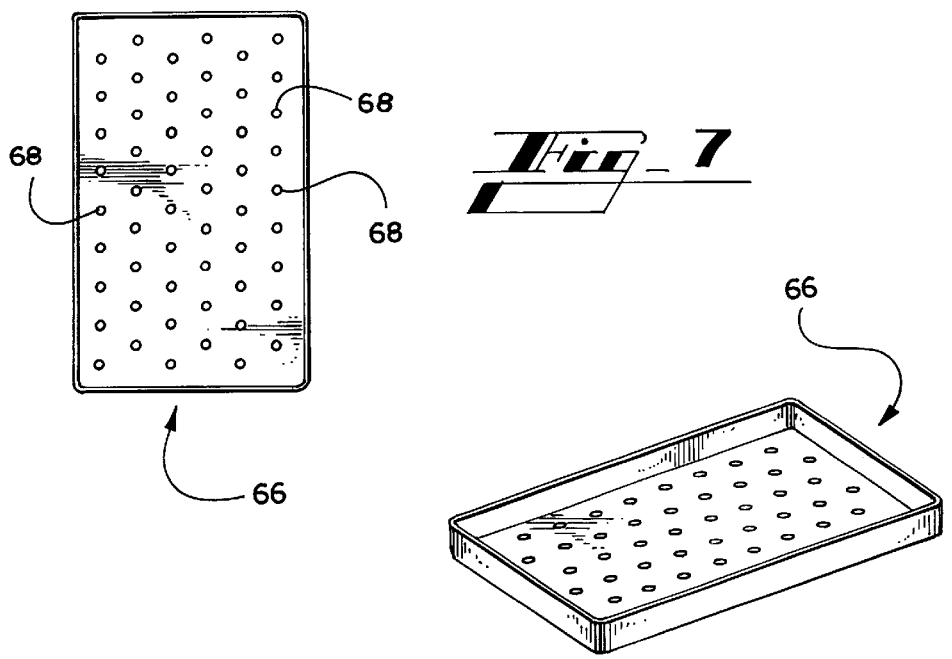
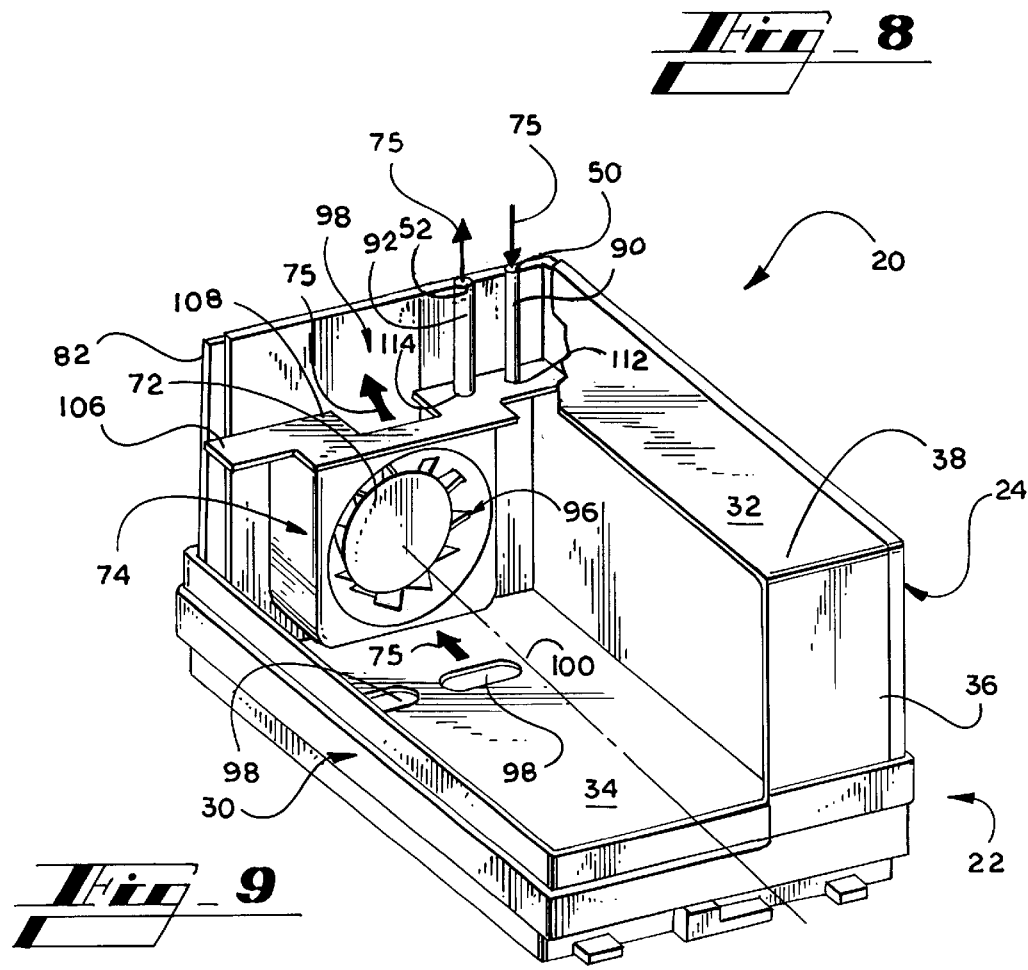

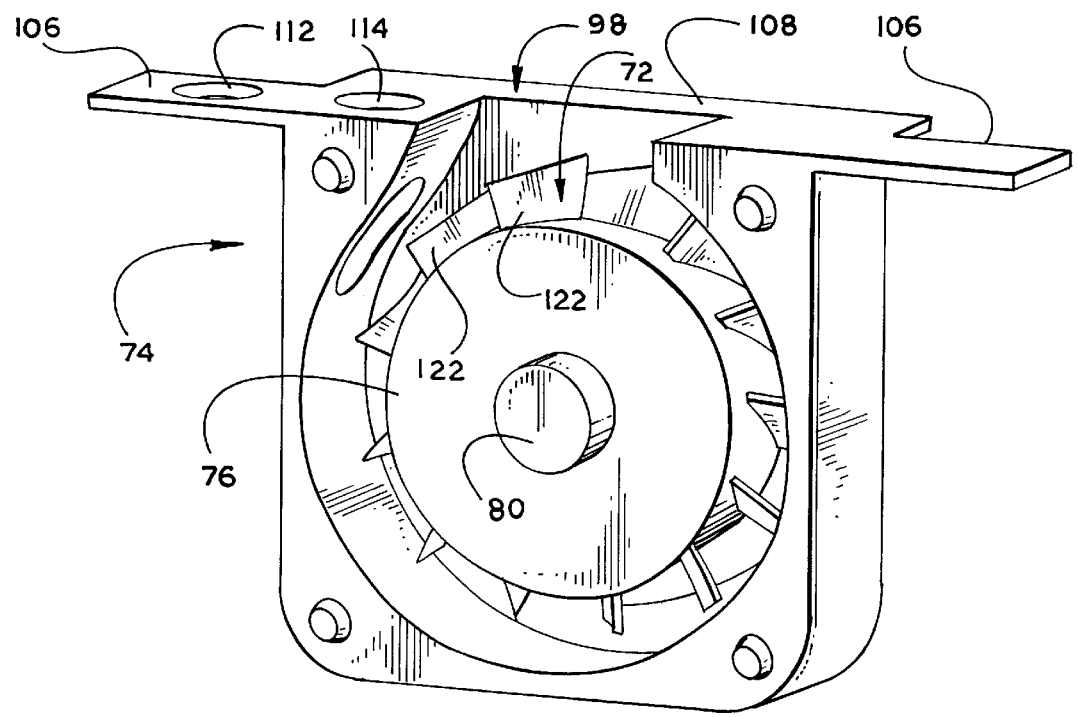
Fig_10
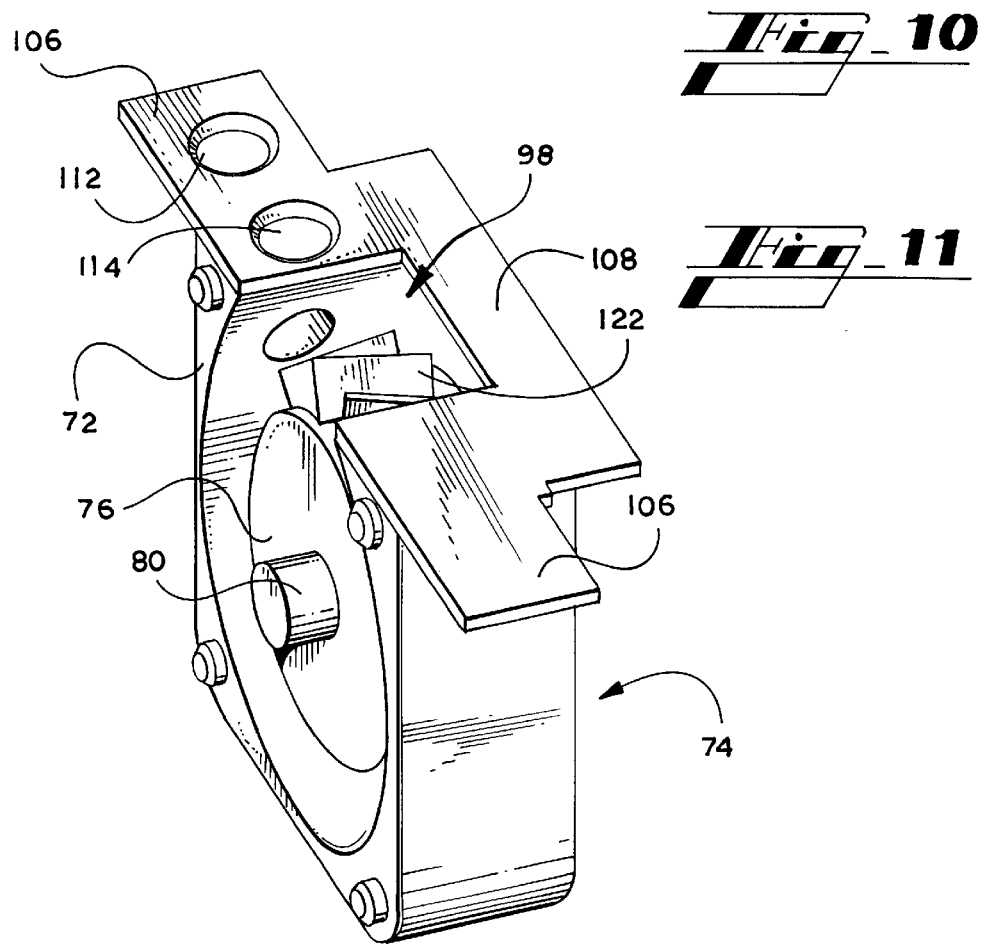
Fig_11

PRIMARY METAL-POWER SOURCE AND VENTILATION SYSTEM FOR THE SAME

RELATED APPLICATIONS

This application claims priority from the U.S. Provisional Application 60/063,155 filed Oct. 24, 1997, the disclosure of which is incorporated by reference.

FIELD OF THE INVENTION

The present invention relates to primary (non-rechargeable) electrochemical cells that may be discharged fully and then discarded. This invention more particularly pertains to a primary metal-air power source containing metal-air cells with a diffusion air manager incorporated into the power source housing of the power source that can provide intermittent use at high power levels over a long lifetime.

BACKGROUND OF THE INVENTION

Metal-air cells have been recognized as a desirable means for powering portable electronic equipment, such as personal computers, camcorders and telephones, because such battery cells have a relatively high power output with relatively low weight as compared to other types of electrochemical battery cells. Metal-air batteries include an air permeable cathode, commonly referred to as an oxygen electrode, and a metallic anode separated by an aqueous electrolyte. Electrical energy is created with a metal-air battery by an electrochemical reaction.

Metal-air battery cells utilize oxygen from the ambient air as a reactant in the electrochemical process. During discharge of a metal-air battery, such as a zinc-air battery, oxygen from the ambient air is converted at the oxygen electrode to hydroxide, zinc is oxidized at the anode by the hydroxide, and water and electrons are released to provide electrical energy. Metal-air cells utilize oxygen from the ambient air as a reactant, rather than utilizing a heavier material, such as a metal or metallic composition. To operate a metal-air battery, it is therefore necessary to provide a supply of oxygen to the oxygen electrode of the battery.

To preserve the efficiency, power and lifetime of a metal-air cell, it is desirable to effectively isolate the oxygen electrodes and anode of the metal-air cell from the ambient air while the cell is not operating. For example, U.S. Pat. No. 5,691,074 to Pedicini, entitled "DIFFUSION CONTROLLED AIR VENT FOR A METAL-AIR BATTERY", the entire disclosure of which is incorporated herein by reference, discloses systems for controlling the isolation of one or more metal-air cells from the ambient air while the cells are not operating. In accordance with one example of that which is disclosed by Pedicini, a group of metal-air cells are isolated from the ambient air, except for an inlet passageway and an outlet passageway. These passageways may be, for example, elongate tubes. An air moving device circulates air across the oxygen electrodes and forces air through the inlet and outlet passageways to refresh the circulating air with ambient air, so that oxygen is supplied to the oxygen electrodes. The passageways are sized to (i) pass sufficient airflow while the air moving device is operating to enable the metal-air cells to provided an output current for powering a load, but (ii) restrict airflow while the passageways are unsealed and no air is forced therethrough by the air moving device, so that a limited amount of air diffuses through the passageways. In this latter state, the oxygen electrodes are sufficiently isolated from the ambient air so that the cells have long "shelf life" without sealing the passageways. The passageways may be referred to as "isolating passageways" or "diffusion limiting passageways" due to their isolating capabilities.

In accordance with the above-referenced example from Pedicini, the isolating passageways function to limit the amount of oxygen that can reach the oxygen electrodes. This isolation minimizes the self discharge and leakage or drain current of the metal-air cells. Self discharge can be characterized as a chemical reaction within a metal-air cell that does not provide a usable electric current. Self discharge diminishes the capacity of the metal-air cell for providing a usable electric current. Self discharge occurs, for example, when the zinc anode of a metal-air cell is oxidized by the oxygen remaining within the cell when the cell is turned off, or by oxygen that seeps into the cell during periods of non-use. Leakage current, which is synonymous with drain current, can be characterized as the electric current that can be provided to a closed circuit by a metal-air cell while air is not provided to the cell by an air moving device. Isolating passageways as described above may limit the drain current to an amount smaller than the output current by at least a factor of 50.

The isolating passageways also minimize the detrimental impact of humidity on the metal-air cells, especially while the air moving device is not forcing airflow through the isolating passageways. A metal-air cell that is exposed to ambient air having a high humidity level may absorb too much water through its oxygen electrode and fail due to a condition referred to as "flooding." Alternatively, a metal-air cell that is exposed to ambient air having a low humidity level may release too much water vapor from its electrolyte through the oxygen electrode and fail due to a condition referred to as "drying out." The isolating passageways limit the transfer of moisture into or out of the metal air cells while the air moving device is off, so that the negative impacts of the ambient humidity level are minimized.

The efficiency of the isolating passageways in terms of the transfer of air and water into and out of a metal-air cell can be described in terms of an "isolation ratio." The "isolation ratio" is the ratio of the rate of the water loss or gain of the cell while its oxygen electrodes are fully exposed to the ambient air, as compared to the rate of water loss or gain by a cell while its oxygen electrodes are isolated from the ambient air, except through one or more limited openings. For example, given identical metal-air cells having electrolyte solutions of approximately thirty-five percent (35%) KOH in water, an internal relative humidity of approximately fifty percent (50%), the ambient air having a relative humidity of approximately ten percent (10%), and no fan-forced circulation, the water loss from a cell having an oxygen electrode fully exposed to the ambient air could be more than 100 times greater than the water loss from a cell having an oxygen electrode that is isolated from the ambient air, except through one or more isolating passageways of the type described above. In this example, an isolation ratio of more than 100 to 1 is implied.

Metal-air cells have found limited commercial use in devices, such as hearing aids, which require a low level of power. In these cells, the air openings which admit air to the oxygen electrode are so small that the cells can operate for some time without flooding or drying out as a result of the typical difference between the outside relative humidity and the water vapor pressure within the cell. However, the power output of such cells is too low to operate devices such as camcorders, cellular phones, or laptop computers. Enlarging the air openings of a typical "button cell" would lead to premature failure as a result of flooding or drying out.

Ventilation systems designed to provide the dual functions of providing air to a metal-air cell for power output and isolating the cells during non-use are referred to as air managers. An important component of a successful air manager is an air mover, such as a fan or an air pump. In the past, air movers used in metal-air batteries have been bulky and expensive relative to the volume and cost of the metal-air cells. While a key advantage of metal-air cells is their high energy density resulting from the low weight of the oxygen electrode, this advantage is compromised by the space and weight required by an effective air mover. Space that could otherwise be used for battery chemistry to prolong the life of the battery must be used to accommodate an air mover. This loss of space can be critical to attempts to provide a practical metal-air cell in small enclosures such as the "AA" cylindrical size now used as a standard in many electronic devices. Also, the air mover uses up energy stored in the cells.

One factor increasing the required output characteristics of an air mover for a metal-air cell is the need to overcome the flow resistance of isolating passages of the type described above. To allow smaller capacity air movers, there is a need for an air manager that permits greater ambient air flow to support higher power output while the metal-air battery cells are in use without making the air mover larger or more expensive to acquire or operate. This new air manager should also restrict the ambient air flow to the extent necessary to protect the cells against excess humidity exchange when the metal-air battery cells are no longer is use.

In response to these realized inadequacies, the present invention seeks to provide a primary metal-air power source that can provide intermittent use at high power levels over a long lifetime for portable electronic products. This primary power source must combine one or more high energy metal-air cells with diffusion air manager technology.

BRIEF SUMMARY OF THE INVENTION

The present invention alleviates or solves the above-described problems in the prior art by providing a primary metal-air power source containing one or more metal-air cells with a diffusion air manager incorporated into the power source's power source housing. The present invention seeks to provide a primary metal-air power source demonstrating a high utilization of the cell's metal anode. The ventilation system of the power source controls the isolation of the metal-air cells from the ambient air while the power source is not operating. The airflow into and out of the power source during storage is minimized during in-service storage and, therefore, eliminates the need to seal or close the power source with a door mechanism.

In accordance with the invention, these objects are accomplished by providing a primary metal-air power source having a power source housing for receiving one or more metal-air cells. The metal-air cell includes a primary air cathode, electrolyte, and an anode positioned within the metal-air cell. An intermittently operable air mover is positioned to draw oxygen into the power source housing and move the oxygen past the metal-air cell. The power source housing intermittently isolates the metal-air cell from an environment surrounding the power source housing when the air mover is not operating. The primary metal-air power source is capable of providing at least 80% of the remaining amp hour capacity for at least 30 days after the initial partial discharge of the metal-air cell, at a power level of at least 50 milliwatts at 70 degrees F., and 10% relative outside humidity. Furthermore, the energy capacity of the power source of this invention degrades less than 5% per month after the initial partial discharge of the metal-air cell. The cumulative run time at such a power level preferably is about 5 to 15 hours in such conditions. This cumulative run time may comprise any number of intermittent connections to a load having varying duration.

In accordance with one aspect of the present invention, the power source housing defines an inner chamber for receiving one or more metal-air cells. The air mover is contained within the power source in a housing up against one end wall of the power source housing. An air inlet passageway admits ambient air into the chamber to the metal-air cells in response to operation of the air mover. The oxygen depleted air from the chamber is drawn into the housing and an air outlet passageway passes a portion of the oxygen depleted air from the housing to the exterior of the power source in response to operation of the air mover. An air outlet opening in the housing returns the remaining portion of the airflow from the housing back into the chamber.

Accordingly, an object of this invention is to provide a primary metal-air power source that overcomes the aforementioned inadequacies of prior art primary metal-air power cells.

Still another object of the present invention is to provide a structurally simple and economical primary metal-air power source incorporating a diffusion air manager.

Yet another object of the present invention is to provide a primary metal-air power source with long in-service storage life to service a variety of portable electronic products.

Still another object of the present invention is to provide a ventilation system for a primary metal-air power source wherein the operation of the power source is transparent to the user. That is, in order to operate the ventilation system of the present invention, no action on part of the user is required.

The foregoing has broadly outlined some of the more significant objects and features of the present invention. These should be construed to be merely illustrative of some of the more prominent features and applications of the intended invention. Many other beneficial results can be obtained by applying the disclosed invention in a different manner or by modifying the disclosed embodiments. Accordingly, other objects and a more comprehensive understanding of the invention may be obtained by referring to the detailed description of the preferred embodiment taken in conjunction with the accompanying drawings, in addition to the scope of the invention defined by the claims.

BRIEF DESCRIPTION OF THE DRAWINGS

FIG. 1 is a front sectional view of one embodiment of a primary metal-air power source of the present invention with a plurality of metal-air cells enclosed therein.

FIG. 2 is a top view of the power source shown in FIG. 1.

FIG. 3 is a top sectional view of the power source along line A—A of FIG. 1.

FIG. 4 is a bottom view of one embodiment of the power source housing of the present invention.

FIG. 5 is a top view of one embodiment of a tray for forming a metal-air cell for use in the power source of the present invention.

FIG. 6 is a perspective view of the tray shown in FIG. 5.

FIG. 7 is a top view of one embodiment of a rectangular mask member perforated with openings for forming the metal-air cell in combination with the tray shown in FIGS. 5 and 6.

FIG. 8 is a perspective view of the mask member shown in FIG. 7.

FIG. 9 is a partial perspective view from the right side of one embodiment of the primary metal-air power source of the present invention.

FIG. 10 is a front perspective view of one embodiment of an air mover and housing of the present invention.

FIG. 11 is a top perspective view of the air mover and housing shown in FIG. 10.

DETAILED DESCRIPTION OF THE PREFERRED EMBODIMENT

With reference to the drawings, wherein reference characters refer to similar parts throughout the several views, a new and improved primary metal-air power source embodying the principles and concepts of the present invention and generally designated by the reference number 20 will be described. The power source 20 provides at least 80% of the remaining amp hour capacity of the cells for at least 30 days after the initial partial discharge of the cell, at a power level of at least 50 milliwatts at 70 degrees F. and 10% relative outside humidity. The power source can provide a total output power level of at least 50 mW over a number of spaced apart time segments of connection to one or more current drawing loads. The energy capacity of the power source of this invention while unused degrades less than 5% per month after the initial partial discharge of the cell. Also, the cumulative run time at such a power level preferably is about 5 to 15 hours in such conditions. This cumulative run time may comprise any number of intermittent connections to a load having varying duration. The power source 20 has an initial shelf life before a first expose of the air cathode to air of at least 12 months.

The power source 20 preferably includes a zinc powder anode gelled with the electrolyte, and optimizes zinc utilization. Zinc utilization of 60–97% of the theoretical maximum has been achieved depending on the drain rate. The power source 20 can provide zinc utilization of at least 80% of theoretical maximum current per weight of zinc at a drain current of 30 milliamps per gram of zinc (820 milliamphours per gram), by providing an anode/electrolyte gel including 60–80% zinc by weight of the combined gel. The gelled anode further comprises 40–20% by weight aqueous electrolyte and 1–2% by weight of a gelling agent such as sodium carboxymethylcellulose and is desirably mercury free. In other words, the weight ratio of Zinc to electrolyte in the cell is desirably within a range from 4:1 to 3:2. The electrolyte preferably is about a 25–40% solution of KOH in water. The anode also includes a current collector made of a metal which is capable of conducting electricity produced during discharge of a cell, but not being oxidized during discharge of the cell. Typical metals for the current collector include brass, copper, or a metallic substrate coated with these materials. The anode current collector is desirably a wire mesh or an expanded metal screen.

The metal-air cell of this invention is desirably arranged so that the air cathode is positioned adjacent the gelled anode in a cell case with a separator material in between the air cathode and the gelled anode. The air cathode is disposed adjacent an opening in the cell case so that the air cathode can be exposed to air. Preferably, the metal-air cell of this invention is prismatic in shape.

The gelled anode preferably includes 70% zinc powder by weight of the combined gel, 28.5% aqueous electrolyte by weight of the combined gel, and 1.5% sodium carboxymethylcellulose by weight of the combined gel. The zinc powder is mercury free, but includes 500 ppm lead and is available from Noranda of Pointe Claire, Canada under the designation AE 100 zinc powder. The electrolyte preferably comprises 38% KOH, 2% $ZnO_2$, and 1000 ppm indium in water. The anode also includes a brass screen current collector.

One suitable primary air cathode for the power source of this invention comprises an active layer formed on a current collector. The active layer has an air side which faces outwardly from the cell case and an electrolyte side which faces toward the gelled anode. Generally described, the active layer comprises a mixture of one or more oxygen reduction catalysts, an oxygen adsorptive particulate material, such as carbon black, and a binder/non-wetting agent. Preferably, the oxygen reduction catalyst is distributed throughout the active layer of the air cathode.

Suitable oxygen reduction catalysts are of a type and are present in an amount effective to produce a satisfactory level of current on the first and subsequent discharge cycles of the metal-air cell in which the air electrode is used. Suitable oxygen reduction catalysts include, manganese, silver, cobalt oxides or spinels having the formula $Co_xO_y$, transition metal macrocyclics such as cobalt tetramethoxyphenylporphyrin (CoTMPP), spinels, and perovskites such as lanthanum/nickel/cobalt oxide ($LaNi_{1-x}CO_xOy$) or lanthanum/iron/cobalt oxide ($LaFe_{1-x}CO_xO_y$), and mixtures thereof. Manganese is preferred.

The oxygen absorptive particles in the active layer of the air cathode are preferably carbon black. Desirably, the carbon black is a mixture of carbon black comprising relatively high surface area carbon black and lower surface area carbon black. A suitable high surface area carbon black has a surface area from about 200 to about 2000 $m^2/g$ and a suitable low surface area carbon black has a surface area from about 50 to about 200 $m^2/g$. Suitable binder/non-wetting agents include polytetrafluoroethylene (Teflon).

The relative amounts of the components of the air cathode active layer may vary. Preferably, however, the oxygen reduction catalyst is present in the active layer in a total amount from about 3 to about 10 percent by weight of the active layer, the carbon black is present in an amount from about 70 to about 85 percent by weight of the active layer, and the polytetrafluoroethylene is present in the active layer in a total amount from about 5 to about 25 percent by weight of the active layer. According to one embodiment, the oxygen reduction catalyst is present in an amount of 5% by weight of the active layer, the carbon black is present in an amount of 75% by weight of the active layer, and the non-wetting agent/binder is present in an amount of 20% by weight of the active layer.

The current collector is preferably a nickel plated screen or nickel expanded metal and preferably is a double cold bonded nickel screen. Suitable current collectors are effective conductors of electric current but are inert to the electrolyte and other components of the metal-air cell in which the air cathode is used. Generally, suitable current collectors include fine mesh metal screens and expanded, perforated metal sheets made of non-corrosive metal such as nickel, tin, or titanium.

The separator between the air cathode and the gelled anode is adhered to the electrolyte side of the cathode. More particularly, the separator is oxidation-resistant under conditions of operation of the metal-air cell and is permeable to electrolyte, but substantially impermeable to zinc ions. A suitable material for the separator is 3501 CELGARD™ wettable microporous polypropylene from Hoechst Celanese Corporation of Charlotte, N.C.

The air side of the cathode is covered with a water impermeable film such as a polytetrafluoroethylene film. This film is adhered to the air side of the air cathode and inhibits the transfer of electrolyte in and out of the cell through the air cathode.

The air cathode can be made by conventional methods known to those skilled in the art such as filtration using methanol or water or both as a solvent and the wet paste method using methanol or water as a solvent. U.S. Pat. No. 4,152,489 to Chottiner, titled "MULTI-PLY LAMINAR PASTED AIR ELECTRODES", the entire disclosure of which is incorporated herein by reference, discloses a suitable wet paste method. Desirably, however, the air cathode is made by a dry press method described hereinbelow in Example 1.

Another suitable cathode includes a hydrophobic layer, an active layer, and a current collector. The hydrophobic layer comprises a low surface area, conductive carbon black, such as Shawinigan acetylene black, and a particulate PTFE binder. The active layer comprises an activated carbon treated with potassium permanganate ($KMnO^4$) so as to produce a mixture of $Mn^{+2}$, $Mn^{+3}$, and $Mn^{+4}$ on the carbon surface, a high surface area conductive carbon black, and PTFE (polytetrafluoroethylene) binder. A suitable activated carbon is Calgon Carbon PWA grade activated carbon (available from Calgon Carbon Corporation of Pittsburgh, Pa.) having an iodine surface area of 1100 and the preferred conductive carbon black is Ketjen EC-600 (available from Akzo-Nobel of Chicago, Ill.) or Cabot Black Pearls 2000 (available from Cabot Corporation of Boston, Ma.) having a BET surface area of 1100–1200 $m^2/g$. The ratio of activated carbon to carbon black in the active layer is suitably 60% activated carbon to 40% carbon black. The PTFE binder is present in the active layer in an amount of about 10% by total weight of the active layer.

The hydrophobic layer is made by a dry powder process in a continuous manner. The hydrophobic layer is made by mixing the low surface area, conductive, carbon black and the PTFE binder and dry pressing this material onto a metal grid current collector.

The active layer is made by a liquid suspension of the active layer ingredients and applying the suspension directly to the hydrophobic layer after the hydrophobic layer is formed. The resulting active layer has a thickness of about 3–5 mils (75–250 microns). The final active layer composition is deposited on the hydrophobic layer by techniques such as Mayer rod, roll coating, filter bed deposition, spray coating, and the like.

To form the active layer, the activated carbon is catalyzed with potassium permanganate. The activated carbon is added to a potassium permanganate solution and stirred to form a suspension. Hydrogen peroxide is added to the suspension and then the carbon is filtered and dried at 100/C for four hours.

Next, the potassium permanganate-catalyzed carbon black is chopped and mixed with the high surface area conductive carbon black. An aqueous suspension of PTFE is added to the mixture of catalyzed activated carbon and carbon black to form a paste. This paste is dried for twenty hours at 100/C and then chopped. This material is then deposited on the hydrophobic layer to form the active layer and complete the cathode. Particular embodiments of the two types of cathodes described above are illustrated in the following Examples 1 and 2, respectively.

Example 1

A suitable air cathode found in each of the cells can include a double cold bonded nickel screen current collector and an active layer comprising silver or manganese as an oxygen reduction catalyst present in an amount of 5% by weight of the active layer, carbon black is present in an amount of 75% by weight of the active layer, and polytetrafluoroethylene (Teflon) present in an amount of 20% by weight of the active layer. The carbon black is a mixture of 30% by weight Ketjen EC-60OJD carbon black having a surface area of 1200 $m^2/g$ and 70% by weight Shawinigan carbon black from Chevron having a surface area of 70–90 $m^2/g$. The air side of the cathode is covered with polytetrafluoroethylene film and the separator between the air cathode and the gelled anode is 3501 CELGARD™ wettable microporous polypropylene from Hoechst Celanese Corporation of Charlotte, N.C.

The cathode is made by the dry press method which comprises pressing a dry active layer mixture against a current collector under high temperatures. The active layer mixture is formed by mixing the carbon blacks with $AgNO_3$ and distilled water and then adding Teflon 30B to the mixture. The resulting active layer mixture is dried for over 20 hours in a convection oven at 100° C. The dried active layer mixture is then chopped to a particle size of about 180 microns in a blender.

The current collector is rinsed with MeOH and then the dried active layer mixture is spread on the current collector. The active layer and current collector are wrapped in stainless steel foil and placed between -the plates of a hot hydraulic press. The current collector and active layer are then pressed for 15 minutes at 617° F. and 3,300psig.

Example 2

A manganese catalyzed activated carbon can be made by dissolving 1.9 grams of potassium permanganate in 100 milliliters of deionized water in a stirring vessel. The solution is stirred with an overhead mixer fitted with a saw-tooth, high sheer, dispersion blade. 20.43 grams of activated carbon is added to in a gradual manner to the potassium permanganate solution over an addition time of 2 to 4 minutes. The activated carbon is added such that when 1 aliquot of carbon is wetted, the next aliquot is added. The suspension is stirred for 10 minutes and then 20 milliliters of 30% hydrogen peroxide is added to the suspension fairly slowly, drop by drop under a hood. The resulting suspension is stirred for an additional 15 minutes.

After stirring, the carbon suspension is filtered under vacuum through a Buchner funnel. The filtrate is colorless and the residue is allowed to dry in air for 15 minutes. The resulting carbon cake is dried at atmospheric pressure, under air, at 100° C. for 4 hours and the yield is roughly 21.4 grams of catalyzed carbon.

The hydrophobic layer of the cathode is made by blending a mixture of Shawinigan acetylene carbon black and PTFE binder and dry pressing the mixture onto a metal grid current collector. The hydrophobic layer comprises 65% by weight acetylene black and 35% by weight Teflon binder.

The active layer of the cathode is made by chopping the catalyzed activated carbon in a coffee grounder for 5 minutes. 10.2 grams of the chopped catalyzed activated carbon and 6.8 grams of Ketjen carbon black are mixed for 10 minutes in a kitchen-type blender at a crumb setting. 6 grams of Teflon 30B at a pH of 10 and 25 milliliters of distilled water are added to the catalyzed activated carbon and carbon black mixture and mixed for 40 seconds to form a suspension. This suspension is dried for 20 hours at 100° C. in a convection oven. The dried material is then chopped in a kitchen-type blender at crumb setting to a particle size of about 100 microns. This active layer is then deposited on the previously formed hydrophobic layer in a liquid suspension as described above.

FIG. 1 shows the primary metal-air power source 20 having a two-part power source housing 22 formed of a top cover 24 whose peripheral edge 26 is received within a lip 28 of a bottom tray 30. When assembled, the power source power source housing 22 defines an inner chamber having a top 32, bottom 34, front and back end walls 36, and left and right side walls 38. A pair of openings are formed in one end of the top cover 24 as shown in FIG. 2. One of these openings is an airflow inlet opening 50 and the other is an airflow outlet opening 52. The power source housing 22 preferably is molded of acrylonitrile butadiene styrene (ABS), solvent bonded at the seam where the edge 26 fits into the lip 28.

A plurality of zinc-air cells 60 are stacked within the power source housing 22. Each cell 60 is formed from a tray 62 defining a recess 64 at one end, and a rectangular mask member 66 that fits within a rectangular portion of the tray 62 as shown in FIGS. 5–8. The mask 66 encloses an air cathode and is perforated with openings 68 to allow air to contact the cathode. The openings 68 preferably are about 0.055 inch in diameter and together preferably provide an open area of about 4% of the area of the cathode. An open area in a range from about 1% to about 5% of the cathode area is suitable. The separator (not shown) divides the air cathode from an anode/electrolyte gel (not shown) contained in the tray 62. Electrode tabs (not shown) are connected to the current collectors of the cathode and anode and potted in the recesses 64 that flank a recess 70 so that the tabs are exposed for electrical connection.

As shown in FIG. 3, each cell 60 defines the recess 70 at one end. The aligned recesses 70 of the stacked cells 60 provide a space at the end of the power source housing 22 adjacent to the openings 50, 52. The space is for receiving an air mover 72, such as a fan, and a air mover housing 74 for the fan 72 (FIGS. 10 and 11). The fan 72, powered by the cells 60, draws ambient air in through the opening 50, forces it past air cathodes (discussed below) of the cells, and out the opening 52. The path of the airflow within the power source housing 22, generally designated with the reference number 75, is described in greater detail below.

A circuit board 76 contains electronics for operating the fan in response to the voltage of the cells 60. The fan 72 is rotatably mounted directly to the circuit board 76. A boss 80 (FIGS. 10 and 11) extends from the back of the circuit board 76 opposite the fan 72. The boss 80 snap fits into an opening (not shown) on a panel member 82. The panel member 82 lies in a plane substantially parallel to the front end wall 36. Contacts 78 positioned as shown in FIG. 4 allow the cells 60, their electrode tabs interconnected by internal wiring (not shown), to be connected to a load.

Referring more particularly to the fan control circuit contained on the circuit board 76, fan control includes a voltage sensor (not shown) to monitor the voltage across the air electrodes and to operate the fan when the voltage reaches predetermined levels. The fan control turns the fan on when the voltage across the metal-air cell is less than or equal to a predetermined voltage. Likewise, the fan control means turns the fan off when the voltage across the cell is greater than or equal to a second predetermined voltage. For example, U.S. patent application Ser. No. 08/936,206 to Pedicini et al, entitled "AIR MANAGER CONTROL USING CELL VOLTAGE AS AUTO-REFERENCE", the entire disclosure of which is incorporated herein by reference, discloses a control means and a voltage sensing means for monitoring the voltage across an air electrode and for operating an air mover when the voltage reaches predetermined levels.

The power source shown in FIGS. 1–4 may be configured to be a six volt metal-air battery with six metal-air cells. Such a battery has an energy to load rating of about 50 watt/hours at a drain rate of about 6 watts and about 60 watt/hours at a drain rate of about 3 watts. The predetermined voltage for turning the fan on is approximately 1.05 volts per cell, while the second predetermined voltage for turning the fan off is approximately 1.10 volts per cell. The voltage monitor turns the fan on when the voltage across the cell is less than or equal to approximately 1.05 volts per cell. Likewise, the voltage monitor turns the fan off when the voltage across the cell is greater than or equal to approximately 1.10 volts per cell.

The voltage monitor determines the voltage across the cathode and anode electrode tabs of the cells 60. Because the zinc potential within the air electrode of each cell is relatively stable, the air electrode is used to sense the residual oxygen in the cell. As the oxygen within the housing is depleted, the voltage across each air electrode diminishes. Likewise, as the flow of oxygen into the housing increases, the voltage across the air electrode increases.

The voltage monitor can be positioned at any convenient location within or adjacent to the housing. The preferred voltage monitor is a programmable voltage detection or sensing device such as that sold by Maxim Integrated Products under the mark MAX8211 and MAX8212. Depending upon the desired operation of the fan, the voltage monitor can be an analog circuit for a simple "on/off" switch or can incorporate a microprocessor (not shown) for a more complex algorithm.

The cell stack is formed efficiently, taking into account that each cell has one major side 84 occupied by an air cathode. As shown in FIG. 1, the closed walls of adjacent cell cases are fit tightly together, whereas the cathode walls of adjacent cell cases are spaced apart by connectors 86. The air flow created by the fan 72 thus flows primarily adjacent to the cathode mask surfaces 84 around the connectors 86.

FIG. 9 is a perspective view of the power source housing 22 of the power source 20 showing one embodiment of the ventilation system of the present invention. The ventilation system uniformly distributes airflow through the chamber and to the mask surfaces 84 of the cells 60 in response to operation of the fan 72. Also, the ventilation system substantially restricts airflow to the chamber when the fan is turned off. The fan 72 and air mover housing 74 fit together within the recess 70. The fan 72 inside air mover housing 74 is shown in FIGS. 10 and 11. Connected to the inlet and outlet openings 50, 52 are air inlet and outlet isolating passageways 90 and 92 which extend into the power source housing 22. The passageways 90, 92 are diffusion tubes which restrict passage of air into the cells 60 when the fan 72 is off, as described in U.S. Pat. No. 5,691,074.

The isolating passageways 90, 92 are preferably constructed and arranged to allow a sufficient amount of airflow therethrough while the air mover 72 is operating so that a sufficient output current, typically at least 8 mA, and preferably at least 50 mA can be obtained from the metal-air cells 60. In addition, the isolating passageways are preferably constructed to limit the airflow and diffusion therethrough such that the leakage or drain current that the metal-air cells are capable of providing while the air mover is not forcing airflow through the isolating passageways is less than 1 mA per square inch of oxygen electrode. Thus, the drain current may be limited to an amount that is smaller than the output current by a factor of at least about 50, as described above. In addition, the isolating passageways are preferably constructed (a) to provide an "isolation ratio" of more than 100 to 1, and (b) so that the ratio of airflow rate through the passageways with the air mover turned on to the flow rate with the air mover turned off is 100 to 1 or more.

More specifically, each of the isolating passageways 90, 92 preferably have a width that is generally perpendicular to the direction of flow therethrough, and a length that is generally parallel to the direction of flow therethrough. The length and the width are selected to substantially eliminate airflow and diffusion through the isolating passageways while the fan 72 is not forcing airflow through the isolating passageways. The length is greater than the width, and more preferably the length is greater than about twice the width. The use of larger ratios between length and width are preferred. Depending upon the nature of the metal-air cells, the ratio can be more than 200 to 1. However, the preferred ratio of length to width is about 10 to 1.

Still referring to FIG. 9, the air inlet and outlet passageways 90, 92 are substantially parallel to one another. The front end wall 36 and air mover housing 74 cooperate with one another to enclose the fan 72 against the inside of the power source housing 22. The air mover housing 74 includes a flanged portion 106 extending horizontally from each side of the top of the air mover housing 74. The air mover housing 74 further includes a center flanged portion 108 between the flanged portions 106 that extends horizontally outward from the top of the air mover housing 74. The flanged portion 108, flanged portions 106, and the top of the air mover housing 74 are integrally connected to one another. The flanged portion 108 fits into the recess 70 as shown in FIG. 3. The flanged portions 106, 108 act as a barrier between the cells 60 and the air mover housing 74 to facilitate the circulation of the air within the chamber. There is a gap between the air mover housing 74 and the cells 60 beneath the flanged portions 106, 108. One flanged portion 106 includes an opening 112 and the top of the housing includes an opening 114. The opening 114 extends through a portion of the air mover housing 74 as best shown in FIGS. 10 and 11. Opening 98 is adjacent to opening 114 in the top of the air mover housing 74. The openings 112 and 114 are configured for receiving the passageways 90 and 92, respectively.

The air inlet passageway 90 extends into the chamber and into the opening 112 as best shown in FIG. 9. Ambient air flow 75 is admitted into the chamber beneath the flanged portions 106, 108. Air outlet passageway 92 extends directly from the air mover housing 74 to pass air to the exterior of the power source housing 22. The airflow from the air mover housing 74 passing through the air outlet passageway 92 is dispersed from the air mover housing 74 in a manner substantially tangential to the periphery of the fan 72 having a rotating member 122, to provide a higher flow rate out of the outlet passageway 92. The highest pressure point of the fan 72 is at the periphery of the fan 72.

When the fan 72 is turned on, airflow 75 proceeds through the airflow inlet opening 50 in the top of the power source housing 22, down through the air inlet passageway 90, through opening 112, and into the chamber below the flanged portions 102, 104. As the fan continues to operate, the air flows along the right side wall 38, between the cells 60 and over the mask surfaces 84, towards the back end wall 36. The airflow 75 between the cells is then drawn by the fan towards the front end wall 36. The fan 72 rotates about an axis 100. As the air circulates through the chamber, the airflow passes between the surfaces 84 of the cells and through the air inlet opening 96 of the air mover housing 74 in an axial manner. The fan moves a portion of the airflow through the air outlet passageway 92 and air outlet opening 52 to the exterior of the power source housing 22 as previously described. The remaining majority portion of recirculated airflow is returned to the chamber through opening 98 to once again pass over the cells 60. As shown in FIG. 9, airflow 75 is dispersed in a radial manner back into the chamber through the air outlet opening 98. The air continues to flow over the cells 60 and pass through the air mover housing 74 until power is no longer desired. At such time, the operation of the fan is stopped and ambient airflow into the chamber of metal-air cells is restricted by the passageways 90, 92.

The use of the primary power source 20 incorporating an air manager for controlling airflow to the metal-air cells as described above constitutes an inventive method of the present invention in addition to the power source itself. In practicing the method of venting a power source having a power source housing 22 as described above, the steps include admitting ambient airflow into the chamber in response to operation of the air mover as described above. The method then includes the step of approximately uniformly distributing the ambient airflow through the chamber in response to operation of the air mover. Next, in response to operation of the air mover, the method includes the step of receiving axial airflow from the chamber into the air mover housing 74 as described above. The method also includes the step of recirculating the airflow received into the housing in response to operation of the air mover. Then, the method includes the step of passing a portion of the airflow from the air mover housing in a substantially tangential manner through an isolating passageway to the exterior of the power source housing in response to the operation of the air mover. The method of the present invention then includes the step of returning the remaining portion of the airflow in the air mover housing back into the chamber in substantially a radial manner in response to operation of the air mover. The invention also includes the step of restricting airflow into the chamber when the air mover is turned off.

Alternatively, the use of the primary power source 20 having a power source housing 22 that incorporates an air manager for controlling airflow to one or more metal-air cells includes the step of admitting ambient airflow into the chamber in response to operation of the air mover as described above. The method then includes the step of approximately uniformly distributing the ambient airflow through the chamber in response to operation of the air mover. Next, also in response to operation of the air mover, the method includes the step of recirculating the airflow received into the housing. The method also includes the step of dividing the recirculated airflow into first and second portions in response to operation of the air mover. Then, the method includes the step of passing the first portion from the air mover housing through an isolating passageway to the exterior of the power source housing in response to operation of the air mover. The method also includes returning the second portion into the chamber in response to the operation of the air mover. The method of the present invention then includes the step of restricting ambient airflow into the chamber while the air mover is turned off.

The present invention has been illustrated in great detail by the above specific examples. It is to be understood that these examples are illustrative embodiments and that this invention is not to be limited by any of the examples or details in the description. Those skilled in the art will recognize that the present invention is capable of many modifications and variations without departing from the scope of the invention. Accordingly, the detailed description and examples are meant to be illustrative and are not meant to limit in any manner the scope of the invention as set forth in the following claims. Rather, the claims appended hereto are to be construed broadly within the scope and spirit of the invention.

What is claimed is:

1. A power source, comprising:

a power source housing defining a chamber containing a cell including an air electrode isolated from an environment surrounding said housing except for an inlet diffusion tube;

a fan housing communicating with said chamber, said fan housing including a fan having a rotating fan blade, an outlet diffusion tube extending from said fan housing tangentially with respect to a periphery of said fan blade to direct a flow of air between said fan housing and said environment;

an air flow path defined within said chamber passing radially from a fan housing opening, then adjacent to said air electrode, and then axially into said fan housing through a fan housing inlet;

said diffusion tubes restricting air flow between said air electrode and the environment surrounding said housing when said fan is not operating and said diffusion tubes are unsealed.

2. The power source of claim 1, wherein said diffusion tubes provide an isolation ratio of more than 100 to 1.

3. The power source of claim 1, wherein said cell is a primary zinc-air cell and includes a primary air cathode, electrolyte, and a zinc anode, said electrolyte comprising an aqueous solution of KOH having a KOH concentration within a range from about 25 to 40%, and the weight ratio of Zn to electrolyte in said zinc-air cell being within a range 4:1 to about 3:2, said zinc-air cell demonstrating a zinc utilization rate of at least 60%.

4. The power source of claim 3 wherein said zinc-air cell is capable of providing a power output of at least 50 mW during one or more time segments of connection to one or more current drawing loads.

5. The power source of claim 3 wherein said zinc-air cell is capable of providing output of at least 50 mW beginning at least 30 days after a first exposure of the air cathode to air.

6. The power source of claim 3 wherein said zinc-air cell has an initial shelf life before a first exposure of the air cathode to air of at least 12 months.

7. The power source of claim 1, wherein the power source is capable of providing a single discharge of at least 50 mW over a plurality of spaced apart time segments of connection to one or more current drawing loads, said single discharge having a cumulative duration of at least 5 hours.

8. The power source of claim 7, wherein said power source is capable of providing output of at least 80% of the remaining amp hour capacity of the power source beginning at least 30 days after a first exposure of said air cathode to air drawn into said housing by said air mover.

9. The metal-air power source of claim 1, wherein said chamber contains a plurality of prismatic zinc-air cells each defining a recess at one end of the cell; wherein said cells are stacked within said chamber with said recesses aligned to form an open space adjacent to a wall of said power source housing, and wherein said fan housing is positioned within said open space.

* * * * *

UNITED STATES PATENT AND TRADEMARK OFFICE
CERTIFICATE OF CORRECTION

PATENT NO.   : 6,242,121 B1                                              Page 1 of 1
DATED        : June 5, 2001
INVENTOR(S)  : Pedicini et al.

It is certified that error appears in the above-identified patent and that said Letters Patent is hereby corrected as shown below:

<u>Title page,</u>
Item [56], References Cited, U.S. PATENT DOCUMENTS, insert the following:
-- 5,536,590     7/1996     Cheiky
5,560,999        10/1996    Pedicini et al.

U.S. Patent Application Serial No. 08/556,613 "Control Fan Configuration and Diffusion and Diffusion Air Door," now Patent 5,919,582 --.

FOREIGN PATENT DOCUMENTS, insert the following:
-- WO 97/15090      10/1996       PCT/International Application
WO 96/09656         9/1995        PCT/International Application
WO 94/02966         7/1992        PCT/International Application Pub. No. 06203886   7/1994  Patent Abstracts of Japan, "Button Type Air-Zinc Battery" --.

OTHER PUBLICATIONS, insert the following:
-- "Primary Battery Session, Non-Reserve Primary Zinc-Air Batteries," Biddick et al., Gould, Inc., St. Paul, Minn. 55165, pp. 151-153.
"Advanced Zinc-Air Batteries," Putt et al., Matsui, Inc., Aerospace Power, Conversion Technology, Electrochemical Conversion, Atlanta, Vol. 1, NR. Conf. 28, pp. 1.1085-1.1089, Institutes of Electrical and Electronics Engineers, August 8, 1993. --.

Signed and Sealed this

Sixteenth Day of July, 2002

*Attest:*

*Attesting Officer*

JAMES E. ROGAN
*Director of the United States Patent and Trademark Office*